US010068536B2

(12) United States Patent
Miura et al.

(10) Patent No.: US 10,068,536 B2
(45) Date of Patent: Sep. 4, 2018

(54) CIRCUIT DEVICE, ELECTRO-OPTICAL DEVICE, AND ELECTRONIC APPARATUS

(71) Applicant: SEIKO EPSON CORPORATION, Tokyo (JP)

(72) Inventors: Masahiko Miura, Chino (JP); Norichika Muraki, Hara-mura (JP)

(73) Assignee: SEIKO EPSON CORPORATION, Tokyo (JP)

( * ) Notice: Subject to any disclaimer, the term of this patent is extended or adjusted under 35 U.S.C. 154(b) by 73 days.

(21) Appl. No.: 15/262,794

(22) Filed: Sep. 12, 2016

(65) Prior Publication Data

US 2017/0076692 A1 Mar. 16, 2017

(30) Foreign Application Priority Data

Sep. 16, 2015 (JP) ................................ 2015-182893

(51) Int. Cl.
*G09G 5/02* (2006.01)
*G09G 5/10* (2006.01)
*H04N 1/60* (2006.01)
*G09G 3/36* (2006.01)

(52) U.S. Cl.
CPC ......... *G09G 3/3607* (2013.01); *G09G 3/3685* (2013.01); *G09G 2320/08* (2013.01); *G09G 2340/08* (2013.01)

(58) Field of Classification Search
CPC combination set(s) only.
See application file for complete search history.

(56) References Cited

U.S. PATENT DOCUMENTS 9,001,106 B2 * 4/2015 Choi ...................... G09G 3/348 345/212
9,830,882 B2 * 11/2017 Yata ......................... G09G 5/02
2014/0218386 A1 * 8/2014 Tatsuno ............... G09G 3/3607 345/590
2015/0138178 A1 * 5/2015 Woo ..................... G09G 3/3233 345/212
2016/0111050 A1 * 4/2016 Pyun .................... G09G 3/3607 345/694

FOREIGN PATENT DOCUMENTS

JP 2000-194005 A 7/2000
JP 2005-134645 A 5/2005

* cited by examiner

*Primary Examiner* — Wesner Sajous
(74) *Attorney, Agent, or Firm* — Oliff PLC

(57) ABSTRACT

A circuit device includes an interface unit that receives pieces of display data RD, GD, and BD, a data processing unit that performs data processing on the pieces of display data RD, GD, and BD, and a drive unit that drives a display panel based on display data from the data processing unit. The data processing unit performs data processing in which the display data RD that has been input to a first color component input channel of the interface unit is set to a first color component channel, a second color component channel, and a third color component channel of the same pixel. The drive unit drives the display panel based on the display data set in the first color component channel, the second color component channel, and the third color component channel.

9 Claims, 9 Drawing Sheets

| MODE SETTING | | INPUT TO INTERFACE UNIT | | | OUTPUT FROM DATA PROCESSING UNIT | | |
|---|---|---|---|---|---|---|---|
| BS | MC | RD | GD | BD | RQ1 | GQ1 | BQ1 |
| 0 | 0 | R | G | B | R | G | B |
| | 1 | M1 | M2 | M3 | M1 | M2 | M3 |
| 1 | 0 | R,G,B | × | × | R | G | B |
| | 1 | M | × | × | M | M | M |

FIG. 2

CIRCUIT DEVICE, ELECTRO-OPTICAL DEVICE, AND ELECTRONIC APPARATUS

BACKGROUND

1. Technical Field

The present invention relates to a circuit device, an electro-optical device, an electronic apparatus, and the like.

2. Related Art

Display panels include color display panels whose pixels (or subpixels) are provided with color filters having different colors, and monochrome display panels whose pixels are not provided with color filters (or provided with filters having the same color). There are cases where a color display panel and a monochrome display panel are each combined with the same display driver to configure a display device in order to use a component in common or the like, for example. For example, an invention of a liquid crystal display device in which a monochrome liquid crystal display panel is driven using a display driver for driving a color liquid crystal display is disclosed in JP-A-2005-134645.

In the case where a color display panel and a monochrome display panel are each combined with the same display driver, as described above, modifications between the combinations (change in control or design of a display device including a display panel, a display controller, and a display driver, for example) need to be as small as possible.

For example, in a known technology in JP-A-2005-134645, one piece of data (six bits) is supplied for one pixel in a monochrome display panel. The display controller outputs single color serial data in a monochrome mode, and thus serially outputs three pixel's worth of data. A source driver, which is for a color display, drives three pixels (corresponding to R, G, and B subpixels in color display) at the same time, and therefore serial three pixel's worth of data is converted to parallel data and the parallel data is supplied to the source driver. Here, a frequency of the clock for latching the serial data is three times the frequency of the clock for latching the parallel data.

That is, in the known technology, the data output frequency of the display controller in monochrome display becomes three times of that in color display, and therefore there is a need to change the display control in the display controller. Also, data is subjected to serial-parallel conversion before being supplied to the source driver in monochrome display, and therefore there is a need to provide a serial-parallel conversion circuit for monochrome display.

SUMMARY

According to some aspects of the invention, a circuit device, an electro-optical device, an electronic apparatus, and the like in which change in control or design between a color display device and a monochrome display device can be reduced can be provided.

One aspect of the invention relates to a circuit device including: an interface unit that receives display data; a data processing unit that performs data processing on the display data; and a drive unit that drives a display panel based on the display data from the data processing unit, wherein the data processing unit performs data processing in which the display data that has been input to a first color component input channel of the interface unit is set to a first color component channel, a second color component channel, and a third color component channel of a same pixel, and the drive unit drives the display panel based on the display data set to the first color component channel, the second color component channel, and the third color component channel.

According to one aspect of the invention, display data that has been input to the first color component input channel of the interface unit is set to the first color component channel, the second color component channel, and the third color component channel of the same pixel, and the display panel is driven based on the set pieces of display data. That is, when monochrome display data is input to the first color component input channel of the interface unit, the monochrome display data is set to the second color component channel and the third color component channel in the circuit device. Accordingly, the pixel can be driven by the monochrome display data in the first color component channel, and as a result, change in control or design between a color display device and a monochrome display device can be reduced.

Also, according to the one aspect of the invention, the drive unit may drive a first subpixel that constitutes the pixel based on the display data set to the first color component channel, drive a second subpixel that constitutes the pixel based on the display data set to the second color component channel, and drive a third subpixel that constitutes the pixel based on the display data set to the third color component channel.

In this way, the same data voltage is written to the first to third subpixels that constitute the same pixel. Accordingly, a color display panel and a monochrome display panel whose pixel configuration is similar to that of the color display panel (a monochrome display panel configured by removing color filters from the color display panel, for example) can be driven by the same circuit device. The circuit device sets the display data in the first color component channel to the second color component channel and the third color component channel, and therefore color display and monochrome display can be switched without changing the transfer rate of the data from a display controller.

Also, according to the one aspect of the invention, a monochrome display mode and a color display mode can be set, and the data processing unit, in the case where the monochrome display mode is set, may perform data processing in which the display data that has been input to the first color component input channel of the interface unit is set to the first color component channel, the second color component channel, and the third color component channel of the pixel, and in the case where the color display mode is set, may perform data processing in which the display data that has been input to the first color component input channel of the interface unit is set to the first color component channel of the pixel, the display data that has been input to the second color component input channel of the interface unit is set to the second color component channel of the pixel, and the display data that has been input to the third color component input channel of the interface unit is set to the third color component channel of the pixel.

The circuit device includes the monochrome display mode and the color display mode as described above, and therefore a color display panel and a monochrome display panel whose pixel configuration is similar to that in the color display panel can be driven by the same circuit device. That is, the same circuit device can be combined with the color display panel and the monochrome display panel by switching between these modes.

Also, according to one aspect of the invention, the circuit device may further include a terminal or a mode setting unit for setting the monochrome display mode or the color display mode.

As a result of providing a terminal or a mode setting unit for setting the monochrome display mode or the color display mode, as described above, the display mode can be set according to the display panel to be combined with the circuit device.

Also, according to one aspect of the invention, the circuit device further includes: a first color component input terminal for inputting the display data for the first color component input channel to the interface unit; a second color component input terminal for inputting the display data for the second color component input channel to the interface unit; and a third color component input terminal for inputting the display data for the third color component input channel to the interface unit. The data processing unit, in the case where the monochrome display mode is set, may perform data processing in which the display data that has been input to the first color component input terminal is set to the first color component channel, the second color component channel, and the third color component channel of the pixel.

According to one aspect of the invention, in the color display mode, pieces of display data for the one to third color component channels are input to input terminals corresponding to the first to third color component channels, and in the monochrome display mode, monochrome display data is input to an input terminal corresponding to the first color component channel, and the display data is set to the second color component channel and the third color component channel. Accordingly, pieces of display data can be transferred at the same data rate in the monochrome display mode and in the color display mode, and as a result, change in control or design can be reduced.

Also, according to one aspect of the invention, the circuit device further includes a first terminal setting mode and a second terminal setting mode. The interface unit, in the first terminal setting mode, may accept the display data input to the first color component input terminal, and may not accept the display data input to the second color component input terminal and the third color component input terminal. The interface unit, in the second terminal setting mode, may accept the pieces of display data input to the first color component input terminal, the second color component input terminal, and the third color component input terminal. In the case where the monochrome display mode is set in the first terminal setting mode, the data processing unit may perform data processing in which the display data input to the first color component input terminal as the display data for the first color component input channel is set to the first color component channel, the second color component channel, and the third color component channel of the pixel.

In this way, as a result of setting the first terminal setting mode or the second terminal setting mode, whether or not the display data is to be copied between the channels can be set. In the case of setting the first terminal setting mode, the display data is copied between the channels, and the same data voltage can be written into three subpixels of the same pixel in the monochrome display mode.

Also, according to one aspect of the invention, in the case where the monochrome display mode is set in the second terminal setting mode, the data processing unit may perform data processing in which the pieces of display data that have been input to the first color component input channel, the second color component input channel, and the third color component input channel of the interface unit are respectively set to the first color component channel, the second color component channel, and the third color component channel of the pixel.

In this way, in the case of setting the second terminal setting mode, display data is not copied between the channels, and display processing can be performed with pieces of display data that have been input to the respective color component channels. Accordingly, in the second terminal setting mode and the monochrome display mode, individual data voltages are respectively written into three subpixels in one pixel, and the subpixels become the units of display in a monochrome image. Accordingly, compared with the case where one pixel is the unit of display, the resolution is tripled and high resolution monochrome display is made possible.

Also, according to the one aspect of the invention, the interface unit may be an interface unit that receives the display data conforming to differential input.

As described in aforementioned JP-A-2005-134645, in the case where an LVDS interface is adopted in a configuration in which the data transfer rate is tripled in the monochrome display mode, the LVDS communication speed needs to be increased so as to correspond to the tripled transfer rate. In this regard, the data transfer rate is the same in the monochrome display mode and in the color display mode in the one aspect of the invention, and as a result, an increase in LVDS speed is not needed.

Also, another aspect of the invention relates to an electro-optical device including any of the circuit devices described above and the display panel.

Also, another aspect of the invention relates to an electronic apparatus including any of the circuit devices described above.

BRIEF DESCRIPTION OF THE DRAWINGS

The invention will be described with reference to the accompanying drawings, wherein like numbers reference like elements.

FIG. 2 is a diagram for describing operations of the circuit device of the present embodiment.

DESCRIPTION OF EXEMPLARY EMBODIMENTS

Hereinafter, a preferable embodiment of the invention will be described in detail. Note that the embodiment described below is not intended to unduly limit the content of the invention described in the scope of claims, and not all configurations described in this embodiment are necessarily essential as solving means of the invention.

1. Circuit Device

Figure 1:
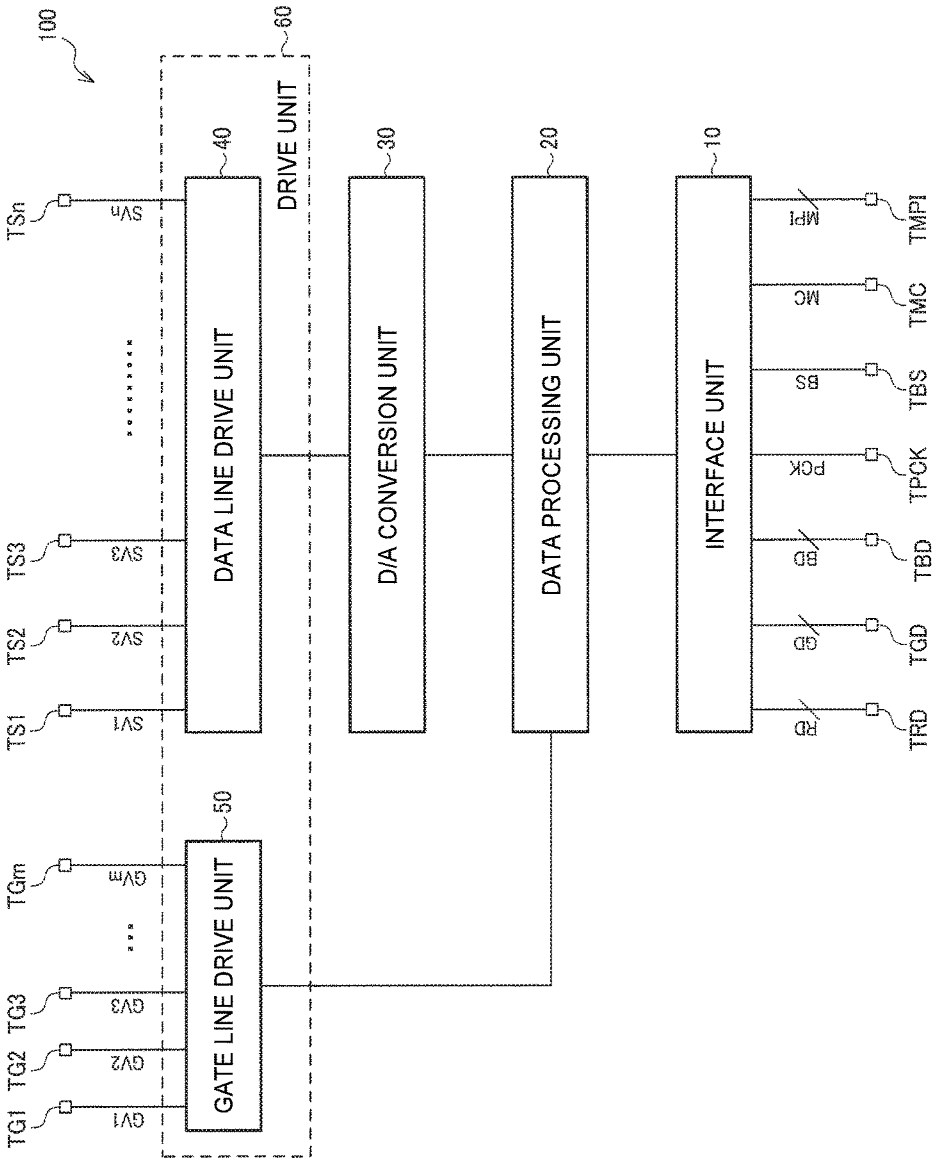
FIG. 1 is a first exemplary configuration of a circuit device of the present embodiment.

A first exemplary configuration of a circuit device 100 (display driver) of the present embodiment is shown in FIG. 1. The circuit device 100 includes an interface unit 10

(interface circuit), a data processing unit 20 (data processing circuit), a D/A conversion unit 30 (D/A conversion circuit), a drive unit 60 (drive circuit), a first color component input terminal TRD, a second color component input terminal TGD, a third color component input terminal TBD, a clock input terminal TPCK, mode setting terminals TBS and TMC, an interface terminal TMPI, data line drive terminals TS1 to TSn (n is an integer of two or more), and gate line drive terminals TG1 to TGm (m is an integer of two or more). The drive unit 60 includes a data line drive unit 40 (data line drive circuit) and a gate line drive unit 50 (gate line drive circuit). The circuit device 100 is realized by an integrated circuit device (IC) or the like, for example.

The interface unit 10 performs communication with an external processing device (display controller such as MPU, CPU, or ASIC, for example). Via communication, image data is transferred, a clock signal and a synchronous signal are supplied, and a command (or a control signal) or the like is transferred. Also, the interface unit 10 accepts terminal settings (input levels of terminals set on a mount substrate). The interface unit 10 is constituted by an I/O buffer or the like, for example.

The data processing unit 20 performs processing on image data, timing control, control of units of the circuit device 100, and the like, based on image data, a clock signal, a synchronous signal, a command, and the like, that are input via the interface unit 10. The processing on the image data is to perform data copying or data exchange between color component channels, image processing (tone correction, for example), and the like, for example. The timing control is to control gate line drive timing (selection timing) and data line drive timing in the display panel based on the synchronous signal and the image data. The data processing unit 20 is constituted by a logic circuit such as a gate array, for example.

The D/A conversion unit 30 D/A converts image data from the data processing unit 20 into data voltages. For example, the D/A conversion unit 30 includes a tone voltage generation circuit and a plurality of D/A conversion circuits (plurality of voltage selection circuits). The tone voltage generation circuit outputs a plurality of voltages, and the voltages respectively correspond to a plurality of tone values. The D/A conversion circuits select voltages corresponding to the image data from among the plurality of voltages from the tone voltage generation circuit. The tone voltage generation circuit is constituted by ladder resistors or the like, for example, and the D/A conversion circuits are each constituted by a switch circuit, for example.

The data line drive unit 40 outputs data voltages SV1 to SVn to data line drive terminals TS1 to TSn based on the data voltages from the D/A conversion unit 30, and drives the data lines in the display panel. The data line drive unit 40 includes a plurality of data line drive circuits that are provided so as to correspond to the plurality of data line drive terminals. The data line drive circuits are each provided so as to correspond to one data line drive terminal or two or more data line drive terminals. In the case where the data line drive circuits are each provided so as to correspond to two or more data line drive terminals, the data line drive circuits each drive two or more data lines in a time division manner. Note that the D/A conversion unit 30 is provided with the D/A conversion circuits so as to respectively correspond to the data line drive circuits, for example.

The gate line drive unit 50 outputs gate line drive voltages GV1 to GVm to the gate line drive terminals TG1 to TGm, and drives (selects) the gate lines in the display panel. For example, in a single-gate display panel, one gate line is selected in one horizontal scanning period. Alternatively, in dual-gate and triple-gate display panels, two and three gate lines are selected in one horizontal scanning period in a time division manner. The gate line drive unit 50 is constituted by a plurality of voltage output circuits (buffers, amplifiers), for example, and the voltage output circuits are provided so as to respectively correspond to the gate line drive terminals, for example.

2. Operations of Circuit Device

A diagram for describing operations of the circuit device 100 of the present embodiment is shown in FIG. 2.

Mode setting signals BS and MC are signals that are input from the mode setting terminals TBS and TMC. For example, the mode setting terminals TBS and TMC are each pulled up or pulled down on the mount substrate of the circuit device 100, and the signal levels thereof are input as the mode setting signals BS and MC. The mode setting signal BS is a selection signal (selection signal for data input format) of a data input bus, and the mode setting signal MC is a selection signal between a color display mode and a monochrome display mode.

Pieces of display data RD, GD, and BD are pieces of display data that are to be respectively input from the first color component input terminal TRD, the second color component input terminal TGD, and the third color component input terminal TBD. In the case where the display data RD for one pixel (or one subpixel) has eight bits (eight bits at maximum), the input terminal TRD includes eight terminals, in actuality, and 8-bit display data RD is input through the eight terminals. The display data RD of a plurality of pixels are serially input in synchronization with a clock signal PCK (pixel clock) that is input from the clock input terminal TPCK. The same also applies to the pieces of display data GD and BD.

Pieces of display data RQ1, GQ1, and BQ1 are pieces of output data of the data processing unit 20 (output data of a latch circuit 24 in FIG. 7), and are each pieces of display data corresponding to a pixel or a subpixel in the display panel. In the case of a color display panel that will be described in FIG. 3, for example, the pieces of display data RQ1, GQ1, and BQ1 respectively correspond to a first color (red) subpixel SP1R, a second color (green) subpixel SP1G, and a third color (blue) subpixel SP1B of a pixel PX1. Alternatively, in the case of a monochrome display panel, which will be described later in FIG. 4, in which color filters are removed from the color display panel, the pieces of display data RQ1, GQ1, and BQ1 respectively correspond to monochrome subpixels SP11, SP12, and SP13 of the pixel PX1. Alternatively, in the case of a monochrome display panel that will be described in FIG. 5, the pieces of display data RQ1, GQ1, and BQ1 respectively correspond to pixels PX1, PX2, and PX5.

As shown in FIG. 2, in the case of the mode setting signals BS=0 (first logic level, in a broad sense) and MC=0, the mode is a color display mode in a first input mode, and copying of display data between channels is not performed. That is, pieces of first color component (R), second color component (G), and third color component (B) display data are respectively input as the pieces of display data RD, GD, and BD, and the data processing unit 20 respectively outputs pieces of first color component (R), second color component (G), and third color component (B) display data as the pieces of display data RQ1, GQ1, and BQ1.

In the case of the mode setting signals BS=0 and MC=1 (second logic level, in a broad sense), the mode is a monochrome display mode in the first input mode, and copying of display data between channels is not performed.

That is, pieces of first monochrome (M1), second monochrome (M2), and third monochrome (M3) display data are respectively input as the pieces of display data RD, GD, and BD, and the data processing unit 20 respectively outputs pieces of first monochrome (M1), second monochrome (M2), and third monochrome (M3) display data as the pieces of display data RQ1, GQ1, and BQ1.

In the case of the mode setting signals BS=1 and MC=0, the mode is a color display mode in a second input mode, and copying of display data between channels is not performed. That is, pieces of first color component (R), second color component (G), and third color component (B) display data are serially input as the display data RD, and the data processing unit 20 performs serial-parallel conversion and respectively outputs pieces of first color component (R), second color component (G), and third color component (B) display data as the display data RQ1, GQ1, and BQ1.

In the case of the mode setting signals BS=1 and MC=1, the mode is a monochrome display mode in the second input mode, and copying of display data between channels is performed. That is, monochrome (M) display data is input as the display data RD. The pieces of display data GD and BD are don't care (x), and are not used for driving the display panel. The data processing unit 20 copies the input monochrome display data, and output three pieces of same monochrome (M) display data as the pieces of display data RQ1, GQ1, and BQ1. Note that, in the case where the data processing unit 20 performs image processing, the display data RD that has been input from the interface unit 10 and the pieces of display data RQ1, GQ1, and BQ1 to be output from the data processing unit 20 may be different.

As will be described later, the display mode of BS=1 and MC=1 makes it possible to drive the monochrome display panel (FIG. 4) that is different from the color display panel in terms of presence/absence of color filters. As a result of realizing such a monochrome display, the circuit device 100 can be used in common in color display and monochrome display systems while reducing changes in control and configuration of the systems.

Next, operations when the display panel is driven in each of the above modes will be described with reference to FIGS. 3 to 5. Note that, although description will be given, hereinafter, taking a dual-gate display panel among active matrix type display panels (TFT liquid crystal panels, for example) as an example, the invention can be applied to display panels other than the dual-gate display panel (single-gate or triple-gate display panel, for example). Also, the invention can be applied not only to the liquid crystal panel, but also to a self-luminous panel (organic EL panel, for example) and the like.

Figure 3:
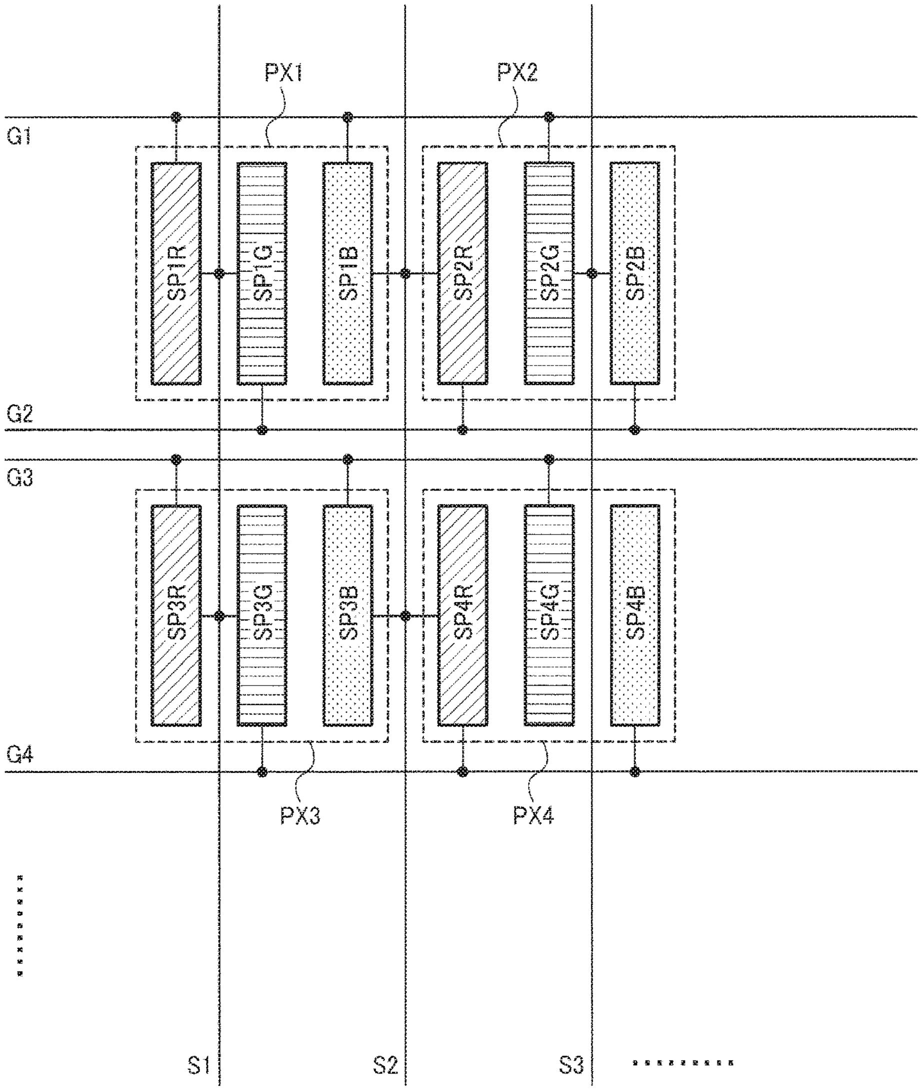
FIG. 3 is an exemplary configuration of a color display panel.

FIG. 3 is an exemplary configuration of a color display panel that is driven by the circuit device 100, and a portion of a pixel array is shown. Pixels PX1 and PX2 are pixels on a first horizontal display line, and pixels PX3 and PX4 are pixels on a second horizontal display line. Each pixel includes R, G, and B subpixels. For example, the pixel PX1 is constituted by a subpixel SP1R provided with a first color (R) color filter, a subpixel SP1G provided with a second color (G) color filter, and a subpixel SP1B provided with a third color (B) color filter.

Each data line is connected to two subpixels on each horizontal display line in common. For example, on the first horizontal display line, a data line S1 is connected to the subpixels SP1R and SP1G, and a data line S2 is connected to the subpixels SP1B and SP2R. Two gate lines are provided for each horizontal display line. One of the two gate lines is connected to one of the two subpixels connected to the same data line, and the other of the two gate lines is connected to the other of the two subpixels connected to the same data line. For example, the first horizontal display line is provided with gate lines G1 and G2, the gate line G1 is connected to the subpixel SP1R among the subpixels SP1R and SP1G that are connected to the data line S1, and the gate line G2 is connected to the subpixel SP1G.

For example, in a horizontal scanning period in which the first horizontal display line is driven, the circuit device 100 selects the gate lines G1 and G2 in a time division manner in the horizontal scanning period. In a period in which the gate line G1 is selected, a write operation to the subpixels SP1R, SP1B, and SP2G is performed by outputting data voltages of the subpixels SP1R, SP1B, and SP2G to the data lines S1, S2, and S3. In a period in which the gate line G2 is selected, a write operation to the subpixels SP1G, SP2R, and SP2B is performed by outputting data voltages of the subpixels SP1G, SP2R, and SP2B to the data lines S1, S2, and S3.

This color display panel is driven in the color display mode (BS=0 or BS=1, MC=0) in FIG. 2. That is, the interface unit 10 accepts pieces of R, G, and B display data RD, GD, and BD, the data processing unit 20 outputs pieces of R, G, and B display data RQ1, GQ1, and BQ1, and the drive unit 60 respectively writes data voltages corresponding to the pieces of display data to the subpixels SP1R, SP1G, and SP1B of the pixel PX1. In this way, R, G, and B data voltages are written into each pixel, and a color image is displayed in the display panel.

Figure 4:
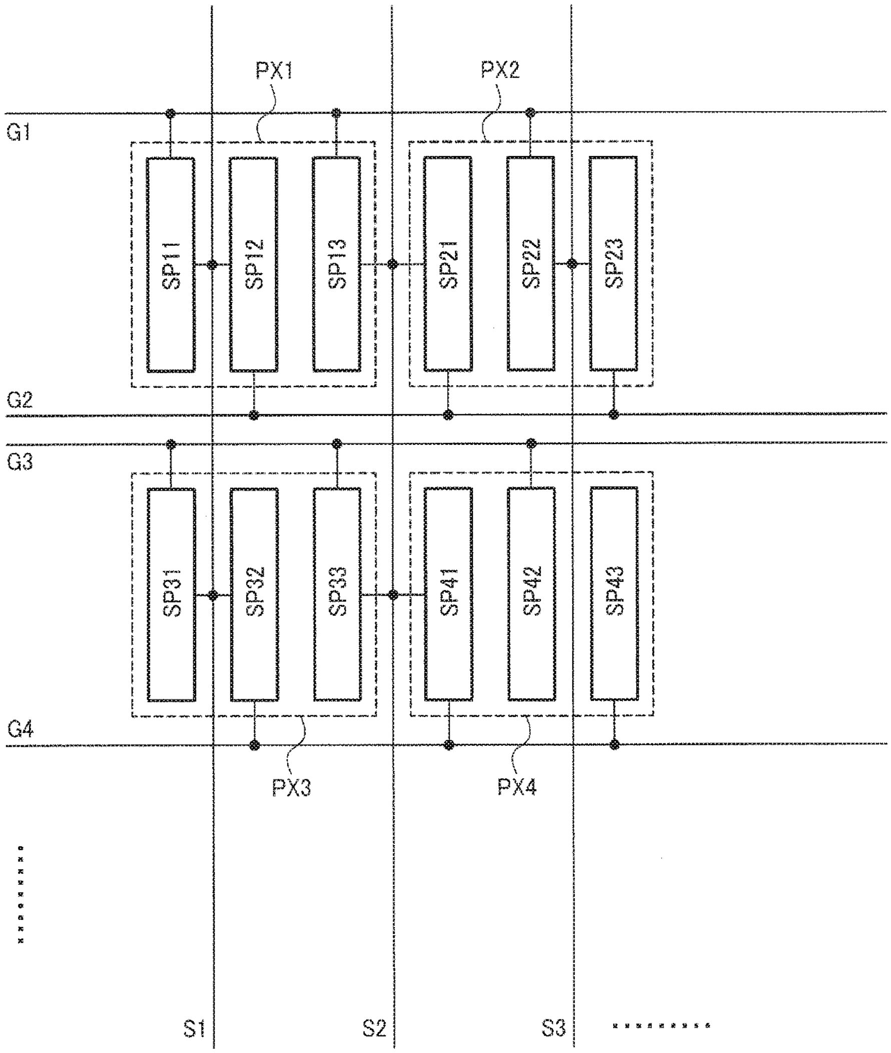
FIG. 4 is a first exemplary configuration of a monochrome display panel.

FIG. 4 is a first exemplary configuration of a monochrome display panel that is driven by the circuit device 100, and a portion of a pixel array is shown. The monochrome display panel is a display panel that is different from the color display panel in FIG. 3 in terms of presence/absence of the color filters (a panel having the same structure as the display panel in the case where the color filters are not formed in the color display panel in FIG. 3, a panel having the same TFT substrate as the color display panel in FIG. 3), and the pixel array configuration is the same as that in FIG. 3. That is, each pixel of the pixels PX1 to PX4 includes three monochrome subpixels. For example, the pixel PX1 is constituted by subpixels SP11, SP12, and SP13, and the subpixels SP11, SP12, and SP13 respectively correspond to subpixels that are the subpixels SP1R, SP1G, and SP1B in FIG. 3 in which color filters are not formed.

Here, monochrome refers to binary values of a single color or a gray scale, and is not limited to black and white. Also, since monochrome refers to single color, monochrome may refer to a color as long as the color being the same color. In this case, the subpixels may be provided with color filters having the same color.

Since the display panel has a dual gate structure, similar to FIG. 3, on the first horizontal display line, a data line S1 is connected to subpixels SP11 and SP12, and a data line S2 is connected to subpixels SP13 and SP21, for example. Also, a gate line G1 is connected to the subpixel SP11 among the subpixels SP11 and SP12 that are connected to the data line S1, and a gate line G2 is connected to the subpixel SP12.

For example, in a horizontal scanning period in which the first horizontal display line is driven, a write operation to the subpixels SP11, SP13, and SP22 is performed in a period in which the gate line G1 is selected by respectively outputting data voltages of the subpixels SP11, SP13, and SP22 to the data lines S1, S2, and S3. In a period in which the gate line G2 is selected, a write operation to the subpixels SP12, SP21, and SP23 is performed by respectively outputting data voltages of the subpixels SP12, SP21, and SP23 to the data lines S1, S2, and S3.

This monochrome display panel is driven in the monochrome display mode (BS=0 or BS=1, MC=1) in FIG. 2. In the case of BS=0, the interface unit 10 accepts pieces of monochrome (M1, M2, and M3) display data RD, GD, and BD, the data processing unit 20 outputs pieces of monochrome (M1, M2, and M3) display data RQ1, GQ1, and BQ1, and the drive unit 60 respectively writes data voltages corresponding to the pieces of display data to the subpixels SP11, SP12, and SP13 of the pixel PX1. In this way, the three subpixels are driven as individual monochrome pixels, and as a result, high resolution display is made possible.

In the case of BS=1, the interface unit 10 accepts monochrome (M) display data RD from a first color component channel, the data processing unit 20 copies the display data to second color component and third color component channels, and the drive unit 60 writes a data voltage corresponding to the monochrome display data to the subpixels SP11, SP12, and SP13 of the pixel PX1. In this way, the same data voltage is written into three subpixels of a pixel, and the pixel can be driven as one monochrome pixel.

Figure 5:
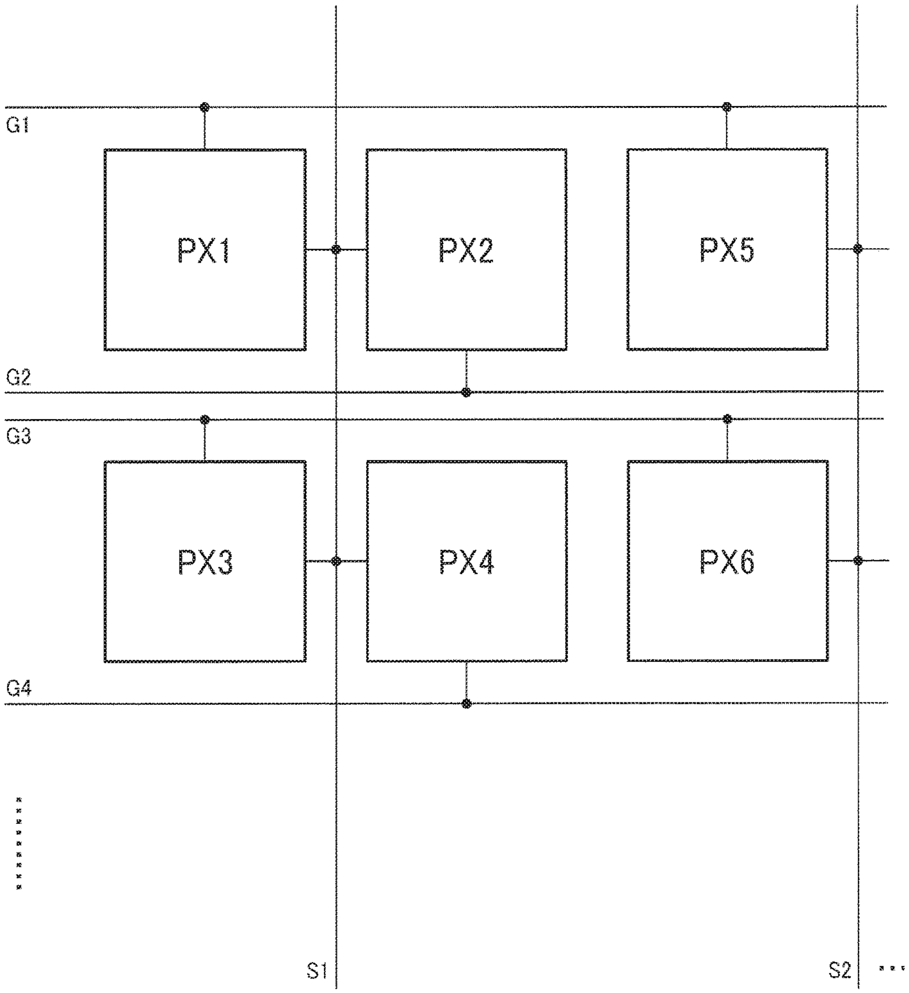
FIG. 5 is a second exemplary configuration of the monochrome display panel.

FIG. 5 is a second exemplary configuration of the monochrome display panel that is driven by the circuit device 100, and shows a portion of the pixel array. Pixels PX1, PX2, and PX5 are pixels on a first horizontal display line, and pixels PX3, PX4, and PX6 are pixels on a second horizontal display line. These pixels are monochrome pixels.

Each data line is connected to two pixels on each horizontal display line in common. For example, on the first horizontal display line, a data line S1 is connected to pixels PX1 and PX2. Two gate lines are provided for each horizontal display line. One of the two gate lines is connected to one of the two pixels connected to the same data line, and the other of the two gate lines is connected to the other of the two pixels connected to the same data line. For example, the first horizontal display line is provided with gate lines G1 and G2, the gate line G1 is connected to the pixel PX1 among the pixels PX1 and PX2 that are connected to the data line S1, and the gate line G2 is connected to the pixel PX2.

For example, in a horizontal scanning period in which the first horizontal display line is driven, the circuit device 100 selects the gate lines G1 and G2 in a time division manner in the horizontal scanning period. In a period in which the gate line G1 is selected, a write operation to the pixel PX1 is performed by outputting a data voltage of the pixel PX1 to the data line S1. In a period in which the gate line G2 is selected, a write operation to the pixel PX2 is performed by outputting a data voltage of the pixel PX2 to the data line S1.

This monochrome display panel is driven in the monochrome display mode (BS=0, MC=1) in FIG. 2. That is, the interface unit 10 accepts pieces of monochrome (M1, M2, and M3) display data RD, GD, and BD, the data processing unit 20 outputs pieces of monochrome (M1, M2, and M3) display data RQ1, GQ1, and BQ1, and the drive unit 60 respectively writes data voltages corresponding to the pieces of display data to the pixels PX1, PX2, and PX5. In this way, each pixel can be driven as a monochrome pixel.

As described above, the circuit device 100 of the present embodiment includes the interface unit 10 that receives pieces of display data RD, GD, and BD, the data processing unit 20 that performs data processing on the pieces of display data RD, GD, and BD, and the drive unit 60 that drives the display panel based on pieces of display data RQ1, GQ1, and BQ1 from the data processing unit 20. The data processing unit 20 performs data processing in which display data RD input to the first color component input channel of the interface unit 10 is set to the first color component channel, the second color component channel, and the third color component channel of the same pixel. The drive unit 60 drives the display panel based on the pieces of display data set in the first color component channel, the second color component channel, and the third color component channel.

Specifically, in the monochrome display mode (BS=1, MC=1) in the second input mode in FIG. 2, the data processing unit 20 copies (or performs image processing and copy) monochrome display data RD input to the first color component input channel, and outputs the same monochrome display data as the pieces of display data RQ1, GQ1, and BQ1 of the subpixels SP11, SP12, and SP13 of the same pixel PX1.

Accordingly, as described in FIG. 4, a monochrome display panel that is configured by removing color filters from a color display panel can be driven. Here, the display data RD input to the first color component input channel of the interface unit 10 is display data for one subpixel, and the display data is copied to pieces of display data for three subpixels internally, and therefore the input rate of the display data is the same as that in the color display mode (BS=0, MC=0) in the first input mode. That is, when viewed from the display controller that supplies the display data to the circuit device 100, supplying monochrome display data to the first color component input channel may suffice, and the data transfer rate need not be changed. Also, since the data transfer rate does not change, a serial-parallel conversion circuit or the like need not be newly provided. That is, only by replacing the display panel with a display panel shown in FIG. 4, and causing the display controller to output monochrome data as the display data, color display can be changed to monochrome display.

Also, even if pieces of data are input to the second color component channel and the third color component channel of the interface unit 10, the pieces of data are not used for driving, and therefore, even if pieces of display data that are the same as those in the color display mode in the first input mode are input, monochrome display is performed by using the display data in the first color component channel. In this case, control has not changed when viewed from the display controller, and therefore monochrome display can also be realized only by changing the display panel to the display panel shown in FIG. 4.

Also, in the present embodiment, the drive unit 60 drives the first subpixel SP11 constituting the pixel PX1 based on the display data RQ1 that is set in the first color component channel, drives the second subpixel SP12 constituting the pixel PX1 based on the display data GQ1 that is set in the second color component channel, and drives the third subpixel SP13 constituting the pixel PX1 based on the display data BQ1 that has been set to the third color component channel.

In the monochrome display mode in the second input mode (BS=1, MC=1) in FIG. 2, the pieces of display data RQ1, GQ1, and BQ1 respectively set in the first color component channel, the second color component channel, and the third color component channel, are the same monochrome display data that is based on the display data RD input to the first color component channel, and therefore the same data voltage is written into the first to third subpixels SP11 to SP13 that constitute the same pixel PX1. That is, this monochrome display, in which the pixel PX1 becomes a unit of display, has a similar pixel configuration (resolution) as the color display in which R, G, and B subpixels of the pixel PX1 constitute a unit of display. In this way, a color display panel and a monochrome display panel that is configured by removing color filters from the color display panel can be driven by the same circuit device 100 (with mode change).

Also, the monochrome display mode (the monochrome display mode in the second input mode (BS=1, MC=1)) and the color display mode (the color display mode in the first input mode (BS=0, MC=0)) can be set in the circuit device 100 of the present embodiment (the circuit device 100 can operate in the monochrome display mode and the color display mode). The data processing unit 20, in the case of being set in the monochrome display mode, performs data processing in which display data RD input to the first color component input channel of the interface unit 10 is set to the first color component channel, the second color component channel, and the third color component channel of the same pixel PX1. The data processing unit 20, in the case of being set in the color display mode, performs data processing in which display data RD input to the first color component input channel of the interface unit 10 is set to the first color component channel of the pixel PX1, display data GD input to the second color component input channel of the interface unit 10 is set to the second color component channel of the pixel PX1, and display data BD input to the third color component input channel of the interface unit 10 is set to the third color component channel of the pixel PX1.

In this way, the circuit device 100 includes the monochrome display mode (BS=1, MC=1) and the color display mode (BS=0, MC=0), and as a result, the color display panel in FIG. 3 and the monochrome display panel in FIG. 4 can be driven by the same circuit device 100. That is, the same circuit device 100 can be combined either with the color display panel in FIG. 3 or with the monochrome display panel in FIG. 4 by switching these modes.

Also, the circuit device 100 of the present embodiment includes a terminal or a mode setting unit for setting the monochrome display mode or the color display mode.

In the exemplary configuration in FIG. 1, the terminals TBS and TMC correspond to the terminal for setting the monochrome display mode or the color display mode.

Figure 6:
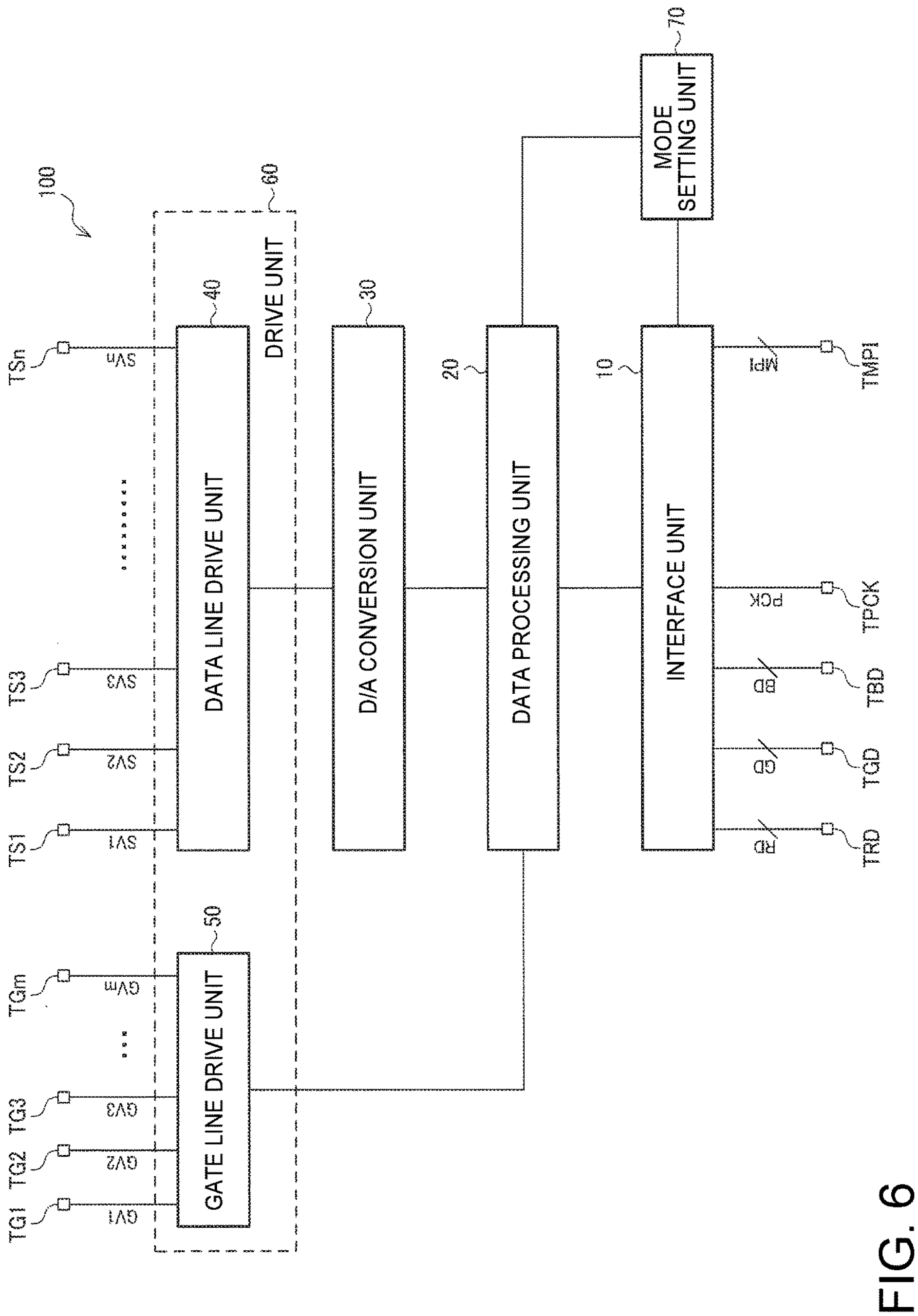
FIG. 6 is a second exemplary configuration of the circuit device of the present embodiment.

A second exemplary configuration of the circuit device 100 of the present embodiment is shown in FIG. 6. In this exemplary configuration, the circuit device 100 includes a mode setting unit 70 for setting the monochrome display mode or the color display mode. Also, the circuit device 100 includes the interface unit 10, the data processing unit 20, the D/A conversion unit 30, the drive unit 60, the first color component input terminal TRD, the second color component input terminal TGD, the third color component input terminal TBD, the clock input terminal TPCK, the interface terminal TMPI, the data line drive terminals TS1 to TSn, and the gate line drive terminals TG1 to TGm. Note that the constituent elements that are the same as those described in FIG. 1 and the like will be given the same reference numerals, and description thereof will be omitted as appropriate.

For example, the interface unit 10 receives a command, a control signal, or the like, for example, from a display controller by communication via the terminal TMPI. The mode setting unit 70 sets the monochrome display mode or the color display mode based on the command or the control signal, and outputs its mode setting signal to the data processing unit 20. The mode setting unit 70 is realized by a register, a processing circuit that processes the command or the control signal and accesses a register, or the like, for example.

Alternatively, the monochrome display mode or the color display mode may be set by a fuse or the like in the mode setting unit 70 when the circuit device 100 is manufactured. Also, the mode setting unit 70 may include a nonvolatile memory and a control circuit therefor, and a setting value for setting the monochrome display mode or the color display mode may be written into the nonvolatile memory when the circuit device 100 is manufactured or a display device is assembled. Also, the mode setting unit 70 may set the monochrome display mode or the color display mode based on an identification signal or the like from a display panel connected to the circuit device 100.

As described above, as a result of providing the terminal or the mode setting unit for setting the monochrome display mode or the color display mode, the display mode according to a display panel that is combined with the circuit device 100 can be set. Basically, the mode is determined based on the type of a display panel that is combined so as to form a display device, and therefore the mode is fixed to one of the modes when used as a display device product. Accordingly, the mode is fixed by the terminal setting in which a terminal is pulled up or down on a mount substrate, or the mode setting unit 70 that is realized by a fuse, a nonvolatile memory, or the like. Note that, naturally, the mode is set to a register or the like from an MPU or the like.

Also, in the present embodiment, the circuit device 100 includes the first color component input terminal TRD for inputting the display data RD in the first color component input channel to the interface unit 10, the second color component input terminal TGD for inputting the display data GD in the second color component input channel to the interface unit 10, and the third color component input terminal TBD for inputting the display data BD in the third color component input channel to the interface unit 10. The data processing unit 20, in the case of being set in the monochrome display mode (BS=1, MC=1), performs data processing in which the monochrome display data RD input to the first color component input terminal TRD is set to the first color component channel, the second color component channel, and the third color component channel of the same pixel PX1.

The input terminals TRD, TGD, and TBD that respectively correspond to color component channels are provided, and display data in the first color component channel is copied in the monochrome display mode (BS=1, MC=1) as described above, and thus pieces of display data in the second color component channel and the third color component channel are internally generated. Accordingly, display data can also be transferred in the monochrome display mode (BS=1, MC=1) at the same data rate as that in the color display mode (BS=0, MC=0).

Note that the terminal configuration is not limited thereto, and the circuit device 100 may include an input terminal for serially inputting display data RD to the first color component input channel, display data GD to the second color component input channel, and display data BD to the third color component input channel to the interface unit 10. In this case, the interface unit 10 performs serial-parallel conversion so as to separate pieces of display data RD, GD, and BD. In the monochrome display mode (BS=1, MC=1), only the display data RD among the pieces of serially input display data is accepted. In this case as well, the data rate of the display data that is serially transferred is the same in the color display mode and the monochrome display mode, and thus the change in the control to be performed by the display controller is small.

Also, in the present embodiment, the circuit device 100 includes the first terminal setting mode (BS=1) and the second terminal setting mode (BS=0). In the first terminal setting mode (BS=1), the interface unit 10 accepts the display data RD input to the first color component input terminal TRD, and does not accept the pieces of display data GD and BD input to the second color component input terminal TGD and the third color component input terminal TBD. In the second terminal setting mode (BS=0), the interface unit 10 accepts the pieces of display data RD, GD, and BD input to the first color component input terminal TRD, the second color component input terminal TGD, and the third color component input terminal TBD. In the case of being set in the monochrome display mode and the first terminal setting mode (BS=1, MC=1), the data processing unit 20 performs data processing in which the display data input to the first color component input channel in the interface unit 10 is set to the first color component channel, the second color component channel, and the third color component channel of the same pixel.

The first terminal setting mode (BS=1) or the second terminal setting mode (BS=0) is set in this way, and thus whether or not the display data is to be copied between the channels can be set. In the case where the first terminal setting mode is set, the display data is copied between the channels and the same data voltage can be written into the three subpixels of the same pixel in the monochrome display mode (BS=1, MC=1).

Also, in the present embodiment, in the case where the monochrome display mode (MC=1) is set in the second terminal setting mode (BS=0), the data processing unit 20 performs data processing in which pieces of the display data RD, GD, and BD input to the first color component input channel, the second color component input channel, and the third color component input channel of the interface unit 10 are respectively set to the first color component channel, the second color component channel, and the third color component channel of a pixel (pixel PX1, for example).

Note that, in the second terminal setting mode, in the case where the color display mode (BS=0, MC=0) is set as well, data processing unit 20 similarly performs the data processing in which pieces of display data RD, GD, and BD input to the first color component input channel, the second color component input channel, and the third color component input channel of the interface unit 10 are respectively set to the first color component channel, the second color component channel, and the third color component channel of a pixel (pixel PX1, for example).

In the case where the second terminal setting mode is set in this way, display data is not copied between the channels, and display processing is performed using pieces of display data input to the respective color component channels. Accordingly, in the monochrome display mode, individual data voltages are written into three subpixels respectively, in one pixel, and the subpixel becomes the unit of display of a monochrome image. Accordingly, when a comparison is made assuming the same pixel size, the resolution in a horizontal direction (vertical direction in a triple gate structure) is tripled in the case where the subpixel is the unit of display relative to the case where one pixel is the unit of display, and as a result, high resolution monochrome display is made possible. Also, because the display control is the same as that in the color display mode, the display controller can perform control for monochrome display only by changing display data, and also, the circuit device 100 need not change the display control.

Note that, as described in FIG. 2, the color display mode (MC=0) may be set in the first terminal setting mode (BS=1). In this case, pieces of display data for the first color component input channel, the second color component input channel, and the third color component input channel are serially input from the first color component input terminal TRD to the interface unit 10. The data processing unit 20 performs data processing in which pieces of display data in the first color component input channel, the second color component input channel, and the third color component input channel that are input from the first color component input terminal TRD are respectively set to the first color component channel, the second color component channel, and the third color component channel of the same pixel (PX1, for example).

Also, in the present embodiment, the interface unit 10 may be an interface unit that receives differential input display data. Specifically, the interface unit 10 may have an LVDS (Low Voltage Differential Signal) interface. The LVDS interface is an interface for performing communication between ICs with a differential signal having a smaller voltage amplitude than the power supply voltage, and is an interface in which a transmitting side drives a differential signal with a differential current, and a receiving side receives the differential signal by converting the differential current to a differential voltage by a terminating resistor.

As described in aforementioned JP-A-2005-134645, in the case where the LVDS interface is adopted in a configuration in which the data transfer rate is tripled in the monochrome display mode, LVDS communication speed needs to be increased so as to correspond to the tripled transfer rate. In this regard, the data transfer rate is the same in the monochrome display mode and in the color display mode in the present embodiment, and as a result increase in LVDS speed is not needed.

3. Data Processing Unit

Figure 7:
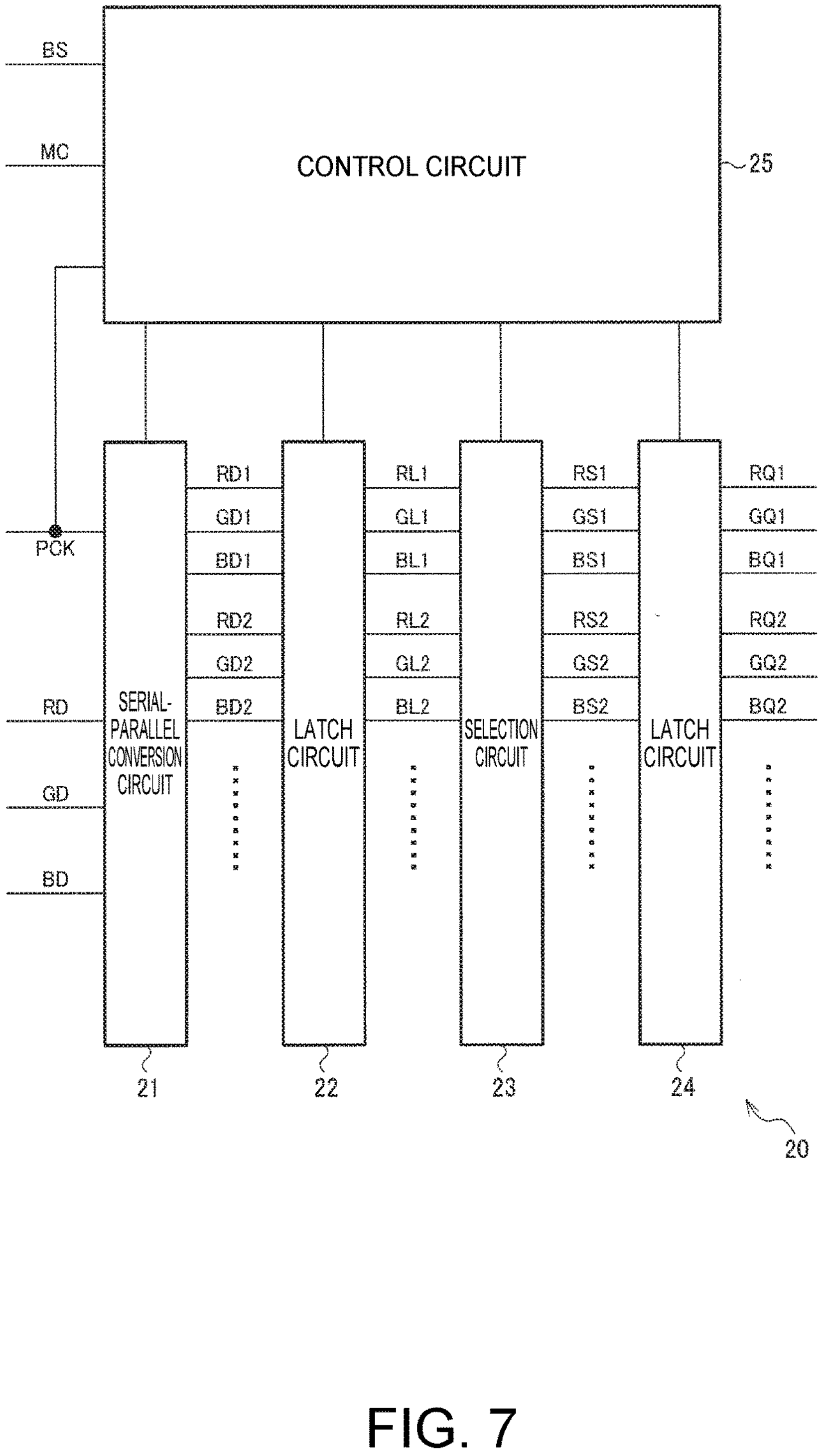
FIG. 7 is a detailed exemplary configuration of a data processing unit.

A detailed exemplary configuration of the data processing unit 20 is shown in FIG. 7. The data processing unit 20 includes a serial-parallel conversion circuit 21, a first latch circuit 22, a selection circuit 23, a second latch circuit 24, and a control circuit 25.

Pieces of display data RD, GD, and BD that are input to the serial-parallel conversion circuit 21 are pieces of display data for pixels that are serially input in synchronization with the clock signal PCK. The serial-parallel conversion circuit 21 performs serial-parallel conversion on the pieces of display data RD, GD, and BD, and outputs pieces of display data RD1, GD1, BD1, RD2, GD2, BD2, etc. for respective subpixels or respective pixels.

The latch circuit 22 latches the pieces of display data RD1, GD1, BD1, RD2, GD2, BD2, etc. from the serial-parallel conversion circuit 21, and outputs pieces of latched display data RL1, GL1, BL1, RL2, GL2, BL2, etc. The latch circuit 22 is a line latch that latches one horizontal display line's worth of display data, for example.

The selection circuit 23 receives the pieces of display data RL1, GL1, BL1, RL2, GL2, BL2, etc. from the latch circuit 22, and outputs pieces of display data RS1, GS1, BS1, RS2, GS2, BS2, etc. that are selected according to the mode setting signal BS.

The latch circuit 24 latches the pieces of display data RS1, GS1, BS1, RS2, GS2, BS2, etc. from the selection circuit 23, and outputs pieces of latched display data RQ1, GQ1, BQ1, RQ2, GQ2, BQ2, etc. The latch circuit 24 is a line latch that latches one horizontal display line's worth of display data, for example. Taking a first horizontal display line as an example, the pieces of display data RQ1, GQ1, BQ1, RQ2, GQ2, and BQ2 are respectively pieces of display data for the subpixels SP1R, SP1G, SP1B, SP2R, SP2G, and SP2B in FIG. 3, or are respectively pieces of display data for subpixels SP11, SP12, SP13, SP21, SP22, and SP23 in FIG. 4. Alternatively, the pieces of display data RQ1, GQ1, and BQ1 are respectively pieces of display data for pixels PX1, PX2, and PX5 in FIG. 5.

The control circuit 25 (timing controller) performs drive timing control and operation control of units of the circuit device 100 based on the mode setting signals BS and MS, the clock signal PCK, the synchronous signal, and the command from the display controller. The control circuit 25 is realized by a logic circuit such as a gate array, for example.

Figure 8:
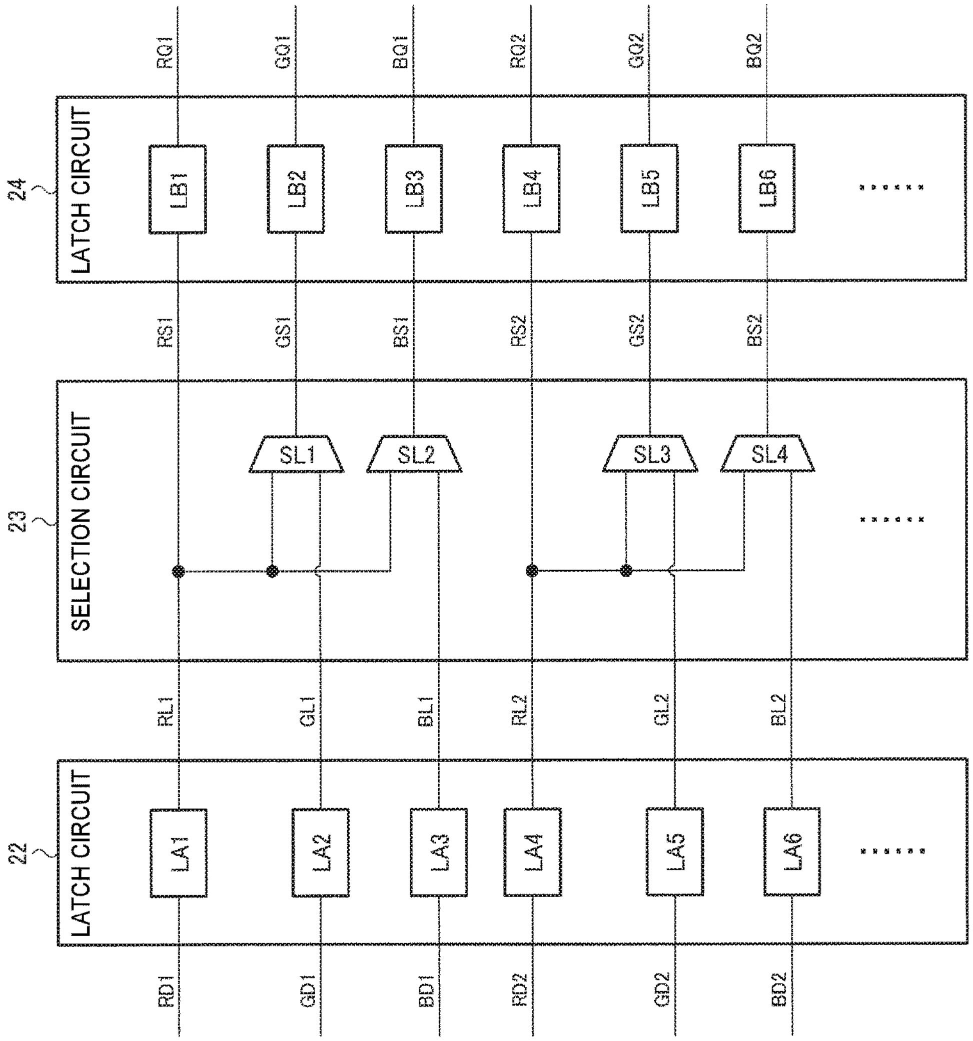
FIG. 8 is a detailed exemplary configuration of a first latch circuit, a selection circuit, and a second latch circuit.

A detailed exemplary configuration of the first latch circuit 22, the selection circuit 23, and the second latch circuit 24 are shown in FIG. 8.

The latch circuit 22 includes latches LA1, LA2, LA3, LA4, LA5, LA6, etc. for respectively latching pieces of display data RD1, GD1, BD1, RD2, GD2, BD2, etc. from the serial-parallel conversion circuit 21. Each piece of display data is constituted by a plurality of bits, and therefore each latch is, in actuality, constituted by a number of latches, the number being equal to the number of bits of display data.

The selection circuit 23 includes a selector SL1 for selecting one of the pieces of display data RL1 and GL1, a selector SL2 for selecting one of the pieces of display data RL1 and BL1, a selector SL3 for selecting one of the pieces of display data RL2 and GL2, and a selector SL4 for selecting one of the pieces of display data RL2 and BL2. In the case of mode setting signal BS=0, the selectors SL1, SL2, SL3, and SL4 respectively select the pieces of display data GL1, BL1, GL2, and BL2. That is, the following equations are established: (RS1, GS1, BS1)=(RL1, GL1, BL1), (RS2, GS2, BS2)=(RL2, GL2, BL2). In the case of the mode setting signal BS=1, the selectors SL1, SL2, SL3, and SL4 respectively select pieces of display data RL1, RL1, RL2, and RL2. That is, following equations are established: (RS1, GS1, BS1)=(RL1, RL1, RL1), (RS2, GS2, BS2)=(RL2, RL2, RL2).

The latch circuit 24 includes latches LB1, LB2, LB3, LB4, LB5, LB6, etc. for respectively latching pieces of display data RS1, GS1, BS1, RS2, GS2, BS2, etc. from the selection circuit 23. Each latch is, in actuality, constituted by a number of latches, the number being equal to the number of bits of a piece of the display data. The latches LB1, LB2, LB3, LB4, LB5, LB6, etc. respectively outputs pieces of latched display data RQ1, GQ1, BQ1, RQ2, GQ2, BQ2, etc.

Note that, although a case where the display data in the first color component channel that is stored in the latch circuit 22 is copied so as to be stored as pieces of display data in the first to third color component channels in the different latch circuit 24 has been described as an example in FIGS. 7 and 8, the embodiment of the invention is not limited thereto. For example, the display data in the first color component channel that is stored in the latch circuit 22 may be copied so as to be stored as pieces of display data in the second and third color component channels in the same latch circuit 22.

4. Electronic Apparatus and Electro-Optical Device

Figure 9:
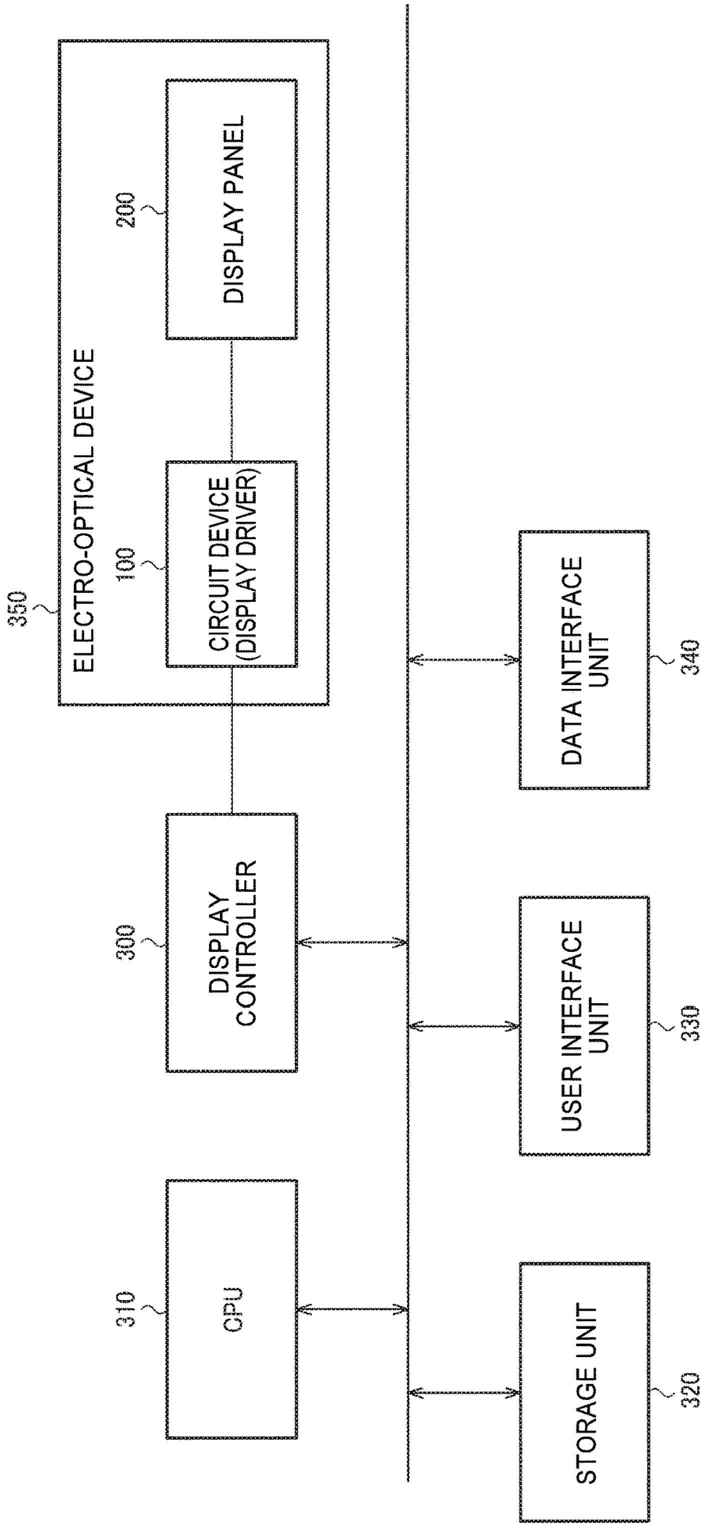
FIG. 9 is an exemplary configuration of an electro-optical device and an electronic apparatus.

An exemplary configuration of an electro-optical device and an electronic apparatus to which the circuit device 100 of the present embodiment can be applied is shown in FIG. 9. Various electronic apparatuses equipped with a display device, such as on-board display device (such as a meter panel, for example), a projector, a television device, an information processing device (computer), a mobile information terminal, a car navigation system, and a mobile game terminal, for example, can be envisioned as the electronic apparatus of the present embodiment.

The electronic apparatus shown in FIG. 9 includes an electro-optical device 350, a CPU 310 (a processing device, in a broad sense), a display controller 300 (host controller), a storage unit 320, a user interface unit 330, and a data interface unit 340. The electro-optical device 350 includes the circuit device 100 (display driver) and a display panel 200.

The display panel 200 is a matrix type liquid crystal display panel, for example. Alternatively, the display panel 200 may be an EL (Electro-Luminescence) display panel using self-luminous elements. For example, the display panel 200 is formed on a glass substrate, and the circuit device 100 is mounted on the glass substrate. The electro-optical device 350 is thus configured as a module that includes the display panel 200 and the circuit device 100 (the electro-optical device 350 may further includes the display controller 300). Note that the display controller 300 and the circuit device 100 may be incorporated into an electronic apparatus as separate components instead of being configured as a module.

The user interface unit 330 is an interface unit that accepts various user operations. For example, the user interface unit 330 is constituted by buttons, a mouse, a keyboard, a touch panel installed in the display panel 200, or the like. A data interface unit 340 is an interface unit that accepts and outputs image data and control data. For example, the data interface unit 340 is a wired communication interface such as a USB, or a wireless communication interface such as a wireless LAN. The storage unit 320 stores the image data that is input from the data interface unit 340. Alternatively, the storage unit 320 functions as a working memory for the CPU 310 and the display controller 300. The CPU 310 performs control processing for each part of the electronic device and various kinds of data processing. The display controller 300 performs control processing for the circuit device 100. For example, the display controller 300 converts image data transferred from the data interface unit 340 or the storage unit 320 via the CPU 310 into data in a format that can be accepted by the circuit device 100, and outputs the converted image data to the circuit device 100. The circuit device 100 drives the display panel 200 based on the image data transferred from the display controller 300.

Note that although the present embodiment has been described above in detail, those skilled in the art will easily understand that various modifications are possible without substantially departing from the new matter and the effect of the invention. Accordingly, all those modifications are to be encompassed in the scope of the invention. For example, a term (such as display driver, red, green, blue) that is used at least once together with another term (such as circuit device, first color, second color, third color) having a broader or the same meaning in the specification or the drawings may be replaced with another term in any part of the specification or the drawings. All combinations of the present embodiment and the modifications are also encompassed in the scope of the invention. Configurations, operations, or the like of the drive unit, the D/A conversion unit, the data processing unit, the interface unit, the circuit device, the electro-optical device, and the electronic apparatus are not limited to those described in the present embodiment either, and may be modified in various manners.

This application claims priority from Japanese Patent Application No. 2015-182893 filed in the Japanese Patent Office on Sep. 16, 2015 the entire disclosure of which is hereby incorporated by reference in its entirely.

What is claimed is:

1. A circuit device comprising:

an interface unit that receives display data;

a data processing unit that performs data processing on the display data; and a drive unit that drives a display panel based on the display data subjected to the processing in the data processing unit, wherein the data processing unit performs data processing in which the display data that has been input to a first color component input channel of the interface unit is set to a first color component channel, a second color component channel, and a third color component channel of a same pixel, the drive unit drives the display panel based on the display data set to the first color component channel, the second color component channel, and the third color component channel, a monochrome display mode and a color display mode can be set, the data processing unit, in a case where the monochrome display mode is set, performs data processing in which the display data that has been input to the first color component input channel of the interface unit is set to the first color component channel, the second color component channel, and the third color component channel of the pixel, and in a case where the color display mode is set, performs data processing in which the display data that has been input to the first color component input channel of the interface unit is set to the first color component channel of the pixel, the display data that has been input to the second color component input channel of the interface unit is set to the second color component channel of the pixel, and the display data that has been input to the third color component input channel of the interface unit is set to the third color component channel of the pixel.

2. The circuit device according to claim 1, wherein the drive unit drives a first subpixel that constitutes the pixel based on the display data set to the first color component channel, drives a second subpixel that constitutes the pixel based on the display data set to the second color component channel, and drives a third subpixel that constitutes the pixel based on the display data set to the third color component channel.

3. The circuit device according to claim 1, further comprising a terminal or a mode setting unit for setting the monochrome display mode or the color display mode.

4. The circuit device according to claim 1, further comprising:

a first color component input terminal for inputting the display data for the first color component input channel to the interface unit;

a second color component input terminal for inputting the display data for the second color component input channel to the interface unit; and a third color component input terminal for inputting the display data for the third color component input channel to the interface unit, wherein the data processing unit, in a case where the monochrome display mode is set, performs data processing in which the display data that has been input to the first color component input terminal is set to the first color component channel, the second color component channel, and the third color component channel of the pixel.

5. The circuit device according to claim 4, further comprising a first terminal setting mode and a second terminal setting mode, wherein the interface unit, in the first terminal setting mode, accepts the display data input to the first color component input terminal, and does not accept the display data input to the second color component input terminal and the third color component input terminal, the interface unit, in the second terminal setting mode, accepts the pieces of display data input to the first color component input terminal, the second color component input terminal, and the third color component input terminal, and in a case where the monochrome display mode is set in the first terminal setting mode, the data processing unit performs data processing in which the display data input to the first color component input terminal as the display data for the first color component input channel is set to the first color component channel, the second color component channel, and the third color component channel of the pixel.

6. The circuit device according to claim 5, wherein, in a case where the monochrome display mode is set in the second terminal setting mode, the data processing unit performs data processing in which the pieces of display data that have been input to the first color component input channel, the second color component input channel, and the third color component input channel of the interface unit are respectively set to the first color component channel, the second color component channel, and the third color component channel of the pixel.

7. The circuit device according to claim 1, wherein the interface unit is an interface unit that receives the display data conforming to differential input.

8. An electro-optical device comprising:

the circuit device according to claim 1, and the display panel.

9. An electronic apparatus comprising the circuit device according to claim 1.

* * * * *